United States Patent [19]
Ito et al.

[11] Patent Number: 5,655,363
[45] Date of Patent: Aug. 12, 1997

[54] AIR-FUEL RATIO CONTROL SYSTEM FOR INTERNAL COMBUSTION ENGINES

[75] Inventors: Hiroshi Ito; Seiji Hatcho; Tetsuya Kaneko; Yoichi Iwata; Tetsu Teshirogi, all of Wako, Japan

[73] Assignee: Honda Giken Kogyo Kabushiki Kaisha, Tokyo, Japan

[21] Appl. No.: 562,367

[22] Filed: Nov. 22, 1995

[30] Foreign Application Priority Data

Nov. 25, 1994 [JP] Japan .................. 6-315667

[51] Int. Cl.$^6$ ............................... F01N 3/20
[52] U.S. Cl. ............................ 60/276; 60/277
[58] Field of Search ...................... 60/276, 277

[56] References Cited

U.S. PATENT DOCUMENTS

| | | | |
|---|---|---|---|
| 5,157,920 | 10/1992 | Nakaniwa | 60/276 |
| 5,157,921 | 10/1992 | Ito et al. | 60/277 |
| 5,402,641 | 4/1995 | Katoh et al. | 60/277 |
| 5,483,795 | 1/1996 | Katoh et al. | 60/276 |

FOREIGN PATENT DOCUMENTS 5-106493   4/1993   Japan.

*Primary Examiner*—John T. Kwon
*Attorney, Agent, or Firm*—Nikaido Marmelstein Murray & Oram LLP

[57] ABSTRACT

An air-fuel ratio control system for an internal combustion engine having a catalyst arranged in the exhaust system, for purifying exhaust gases emitted from the engine. Upstream and downstream air-fuel ratio sensors arranged in the exhaust system at respective locations upstream and downstream of the catalyst detect the concentration of a specific component present in the exhaust gases. An ECU controls the air-fuel ratio of an air-fuel mixture supplied to the engine, in response to the outputs from the upstream and downstream air-fuel ratio sensors. The ECU detects deterioration of the catalyst caused by sulfur poisoning, based on at least the output from the downstream air-fuel ratio sensor.

7 Claims, 8 Drawing Sheets

2

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, which is provided with a catalyst arranged in the exhaust system of the engine, and air-fuel ratio sensors arranged in the exhaust system at locations upstream and downstream of the catalyst, for detecting the concentration of a specific component in exhaust gases emitted from the engine, and which controls the air-fuel ratio of an air-fuel mixture supplied to the engine, in response to outputs from the air-fuel ratio sensors.

2. Prior Art

An air-fuel ratio control system for internal combustion engines is already known, e.g. from Japanese Laid-Open Patent Publication (Kokai) No. 5-106493, which includes air-fuel ratio sensors arranged in the exhaust system of the engine at locations upstream and downstream of a three-way catalyst arranged in the exhaust system of the engine, respectively, and controls the air-fuel ratio of an air-fuel mixture supplied to the engine in a feedback manner responsive to outputs from the air-fuel ratio sensors. The air-fuel ratio control system according to the above publication also has a function of detecting deterioration of the three-way catalyst based on the output from the air-fuel ratio sensor downstream of the three-way catalyst.

In some areas in the world (e.g. in the East of the United States of America), a gasoline containing a large amount of sulfur (e.g. 300 to 800 ppm) is used as fuel for engines. If a gasoline with such a high sulfur content is used in an internal combustion engine, the catalyst arranged in the exhaust system of the engine is poisoned by sulfur present in the gasoline and its oxygen storage capacity is degraded.

However, the conventional catalyst deterioration-detecting method does not contemplate the sulfur poisoning of the catalyst. As a result, when the catalyst undergoes sulfur poisoning, the catalyst is determined to be deteriorated even though it is a new one. Thus, the conventional method cannot discriminate the sulfur poisoning of the catalyst from the deterioration of the catalyst due to aging.

SUMMARY OF THE INVENTION

It is the object of the invention to provide an air-fuel ratio control system for internal combustion engines, which is capable of detecting deterioration of a catalyst arranged in the exhaust system of the engine, caused by sulfur poisoning, while discriminating the same from deterioration of the catalyst due to aging.

To attain the above object, the present invention provides an air-fuel ratio control system for an internal combustion engine having an exhaust system, and a catalyst arranged in the exhaust system, for purifying exhaust gases emitted from the engine, comprising:

upstream air-fuel ratio-detecting means arranged in the exhaust system at a location upstream of the catalyst, for detecting concentration of a specific component present in the exhaust gases;

downstream air-fuel ratio-detecting means arranged in the exhaust system at a location downstream of the catalyst, for detecting concentration of the specific component present in the exhaust gases;

air-fuel ratio control means for controlling an air-fuel ratio of an air-fuel mixture supplied to the engine, in response to outputs from the upstream and downstream air-fuel ratio-detecting means; and sulfur poisoning-detecting means for detecting deterioration of the catalyst caused by sulfur poisoning, based on at least the output from the downstream air-fuel ratio-detecting means.

Preferably, the sulfur poisoning-detecting means determines that the catalyst is sulfur-poisoned when a rich-side maximum value of the output from the downstream air-fuel ratio-detecting means is below a predetermined value.

Also preferably, the sulfur poisoning-detecting means determines that the catalyst is sulfur-poisoned when an area obtained by values of the output from the downstream air-fuel ratio-detecting means which show richer values of the air-fuel ratio of the air-fuel mixture than a predetermined air-fuel ratio is below a predetermined value.

Also preferably, the sulfur poisoning-detecting means determines that the catalyst is sulfur-poisoned when a rate of change in the output from the downstream air-fuel ratio-detecting means from a richer value to a leaner value with respect to a predetermined air-fuel ratio exceeds a predetermined value.

Also preferably, the sulfur poisoning-detecting means determines that the catalyst is sulfur-poisoned when amplitude of the output from the downstream air-fuel ratio-detecting means is below a predetermined value.

Also preferably, the sulfur poisoning-detecting means determines that the catalyst is sulfur-poisoned when a difference between a rich-side maximum value of the output from the upstream air-fuel ratio-detecting means and a rich-side maximum value of the output from the downstream air-fuel ratio-detecting means exceeds a predetermined value.

Also preferably, the sulfur poisoning-detecting means determines that the catalyst is sulfur-poisoned when a difference between amplitude of the output from the upstream air-fuel ratio-detecting means and amplitude of the output from the downstream air-fuel ratio-detecting means exceeds a predetermined value.

The above and other objects, features, and advantages of the invention will become more apparent from the following detailed description taken in conjunction with the accompanying drawings.

DETAILED DESCRIPTION

The invention will now be described in detail with reference to drawings showing an embodiment thereof.

Figure 1:
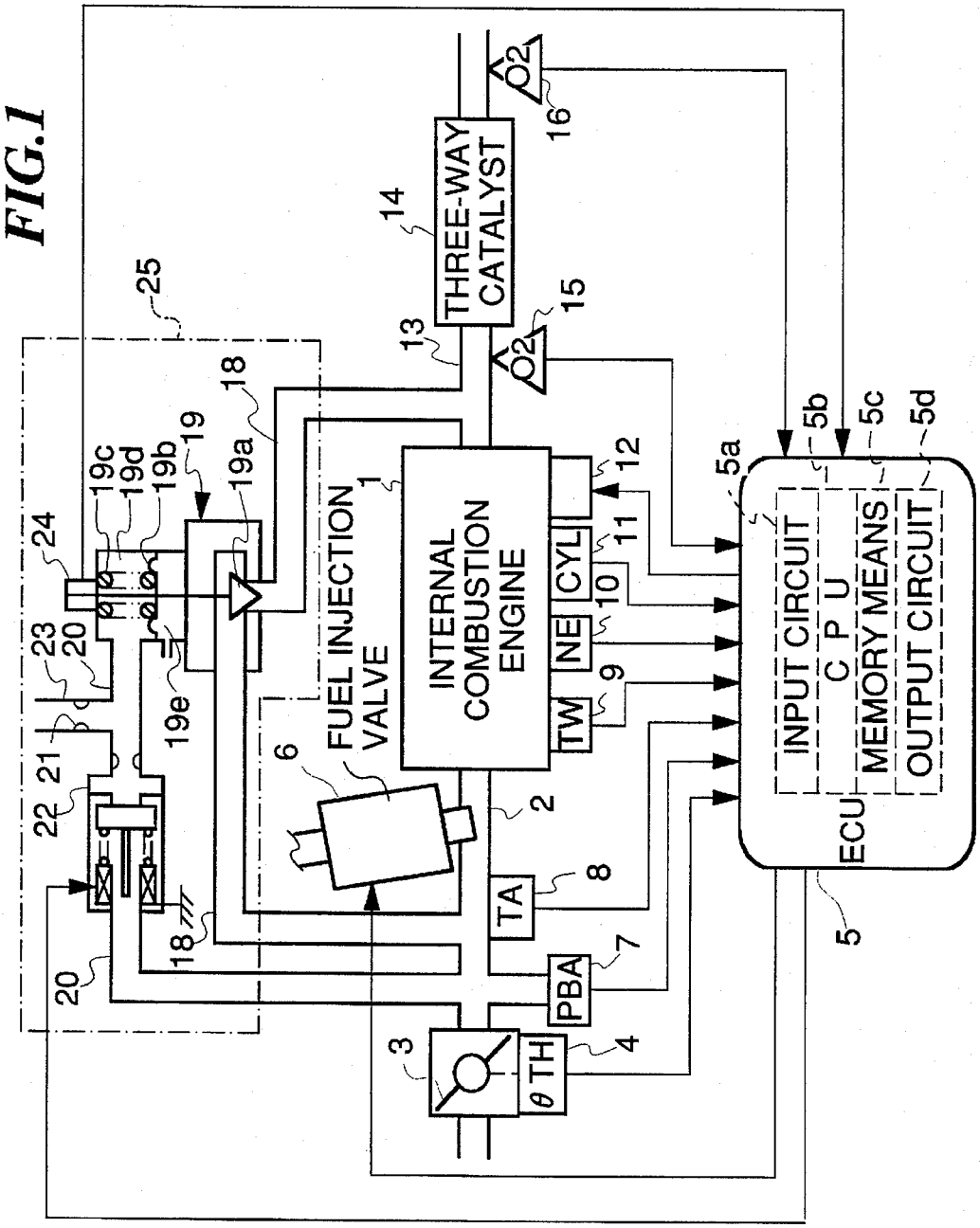
FIG. 1 is a block diagram showing the whole arrangement of an internal combustion engine and an air-fuel ratio sensor deterioration-detecting system therefor, according to an embodiment of the invention.

Referring first to FIG. 1, there is schematically shown the whole arrangement of an internal combustion engine (hereinafter referred to as "the engine") and an air-fuel ratio control system therefor, including an exhaust gas recirculation system, according to an embodiment of the invention.

In the figure, reference numeral 1 designates a four-cylinder engine, which has an intake pipe 2 connected to the cylinder block thereof, across which is arranged a throttle valve 3. A throttle valve opening ($\theta$TH) sensor 4 is connected to the throttle valve 3 for generating an electric signal indicative of the sensed throttle valve opening $\theta$TH to an electronic control unit (hereinafter referred to as "the ECU") 5.

Fuel injection valves 6, only one of which is shown, are each provided for each cylinder and arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is connected to the intake pipe 2 at a location immediately downstream of the throttle valve 3 for sensing absolute pressure or intake pressure (PBA) within the intake pipe 2, and is electrically connected to the ECU 5 for supplying an electric signal indicative of the sensed absolute pressure PBA to the ECU 5. Further, an intake air temperature (TA) sensor 8 is inserted into the intake pipe 2 at a location downstream of the PBA sensor 7, for supplying an electric signal indicative of the sensed intake air temperature TA to the ECU 5.

An engine coolant temperature (TW) sensor 9, which may be formed of a thermistor or the like, is mounted in the cylinder block of the engine which is filled with coolant, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The NE sensor 10 generates a signal pulse (hereinafter referred to as "a TDC signal pulse") at each of predetermined crank angles whenever the crankshaft rotates through 180 degrees, while the CYL sensor 11 generates a signal pulse at a predetermined crank angle of a particular cylinder of the engine, both of the pulses being supplied to the ECU 5. A spark plug 12 of each cylinder of the engine 1 is electrically connected to the ECU 5 to have its ignition timing controlled by the ECU 5.

A three-way catalyst 14 is arranged in an exhaust pipe 13 connected to the engine f, for purifying noxious components in exhaust gases from the engine, such HC, CO, and NOx. Oxygen concentration sensors 15 and 16 are arranged in the exhaust pipe 13 at respective locations upstream and downstream of the three-way catalyst 14 (hereinafter referred to as "the upstream O2 sensor 15" and "the downstream O2 sensor 16"), for detecting the concentration of oxygen present in exhaust gases at their respective locations and supplying electric signals indicative of the sensed oxygen concentration to the ECU 5.

The engine is provided with an exhaust gas recirculation (EGR) system 25.

More specifically, an exhaust gas recirculation passage 18 is provided, which connects between the intake pipe 2 and the exhaust pipe 13, across which is arranged an exhaust gas recirculation control valve (hereinafter referred to as "the EGR valve") 19. This EGR valve 19 is a negative pressure-responsive valve and comprised of a valving element 19a disposed so as to open and close the passage 18, a diaphragm 19b connected to the valving element 19a, which operates in response to negative pressure introduced by an electromagnetic valve 22, referred to hereinbelow, and a spring 19c urging the diaphragm 19b in a direction of closing the valve 19. The interior of the EGR valve 19 is partitioned by the diaphragm 19b into a negative pressure chamber 19d, to which is connected a communication passage 20 to introduce negative pressure or vacuum within the intake pipe 2 through the normally-closed electromagnetic valve 22 arranged across the communication passage 20, and an atmospheric pressure chamber 19e communicating with the atmosphere. Further, an atmospheric pressure communication passage 23 is connected to the communication passage 20 at a location downstream of the electromagnetic valve 22, and the atmospheric pressure is introduced through a restriction 21 arranged in the communication passage 23, into the communication passage 20, and then into the negative pressure chamber 19d. The electromagnetic valve 22 is electrically connected to the ECU 5 and operates in response to a driving signal from the ECU 5 to control the lifting operation of the valving element 19a of the EGR valve 19 and the lifting speed of the same.

A valve lift sensor 24 is provided for the EGR valve 19, which detects the operating position of the valving element of the EGR valve 19, and a signal indicative of the sensed operating position is supplied to the ECU 5.

The ECU 5 determines operating conditions of the engine, based on engine operating parameter signals from the various sensors including ones mentioned above, and supplies a control signal to the electromagnetic valve 22 of the EGR system to make zero a difference between a valve lift command value LCMD of the EGR valve 19, which is set according to the intake pipe absolute pressure PBA and the engine rotational speed NE, and an actual valve lift value LACT of the EGR valve 19, which has been actually detected by the lift sensor 24.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom , etc., and an output circuit 5d which delivers driving signals to the fuel injection valves 6 and the electromagnetic valve 22.

The CPU 5b operates in response to the above-mentioned signals from the sensors to determine operating conditions in which the engine 1 is operating, such as an air-fuel ratio feedback control region and air-fuel ratio open-loop control regions, and calculates, based upon the determined engine operating conditions, the valve opening period or fuel injection period TOUT over which the fuel injection valves 6 are to be opened, by the use of the following equation (1), in synchronism with generation of TDC signal pulses:

$$TOUT = Ti \times KO2 \times K1 + K2 \qquad (1)$$

where Ti represents a basic value of the fuel injection period TOUT, which is determined according to the engine rotational speed NE and the intake pipe absolute pressure PBA. A Ti map for determining the Ti value is stored in the memory means 5c.

KO2 represents an air-fuel ratio correction coefficient which is determined based on outputs from the upstream and downstream O2 sensors 15 and 16 when the engine 1 is operating in the air-fuel ratio feedback control region, while it is set to predetermined values corresponding to the respective air-fuel ratio open-loop control regions of the engine when the engine 1 is in the open-loop control regions.

K1 and K2 represent other correction coefficients and correction variables, respectively, which are set according to engine operating parameters to such values as optimize operating characteristics of the engine, such as fuel consumption and engine accelerability.

The CPU 5b supplies driving signals via the output circuit 5d to the fuel injection valves 6 based on the fuel injection period TOUT thus determined and a driving signal to the electromagnetic valve 22, to drive the fuel injection valves 6 and the electromagnetic valve 22. The CPU 5b also carries out a determination as to sulfur poisoning of the three-way catalyst 14, as well as deterioration due to aging, as hereinafter described in detail.

Figure 2A:
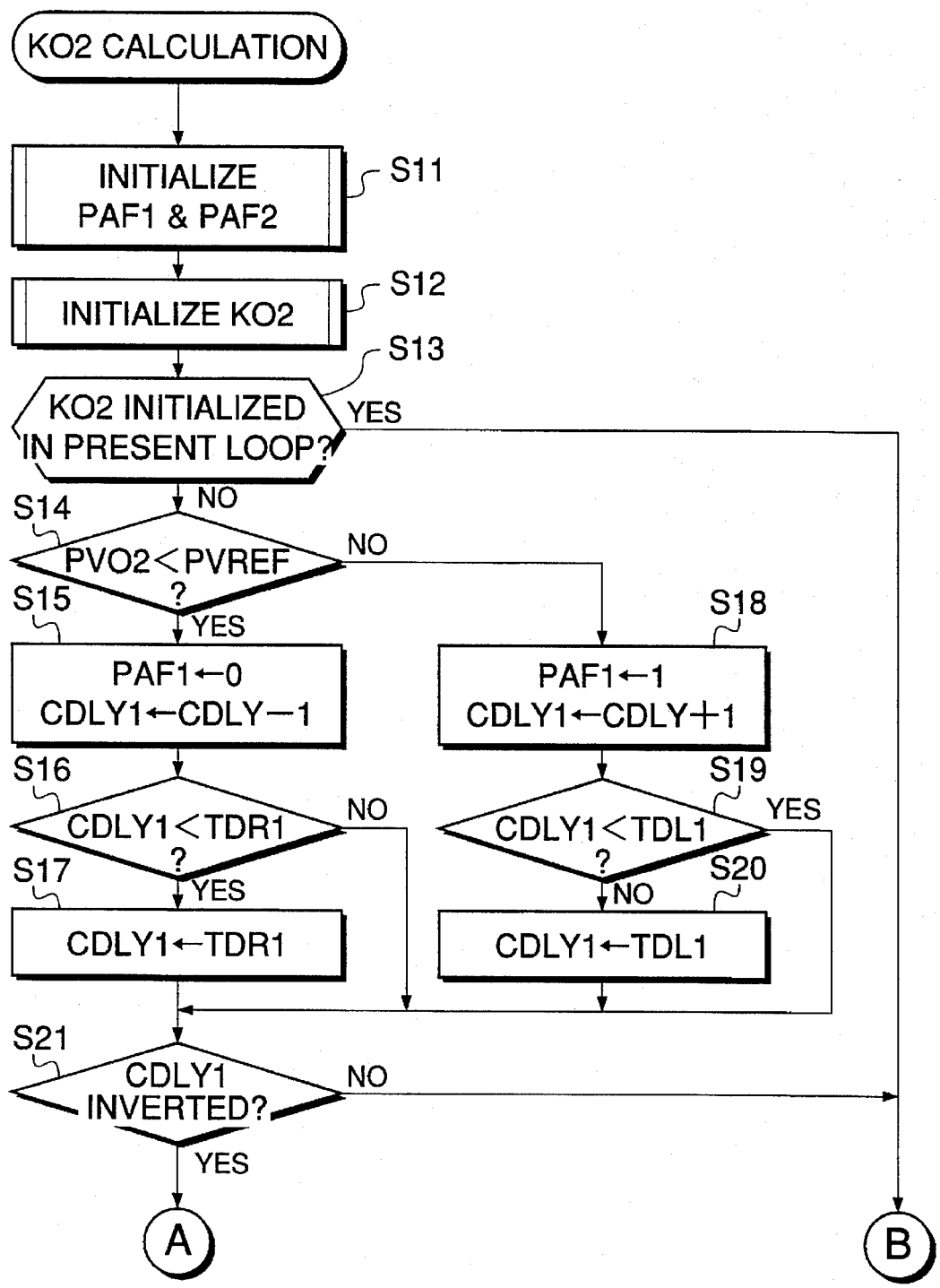
FIG. 2A is a flowchart showing a program for calculating an air-fuel ratio correction coefficient KO2.
Figure 2B:
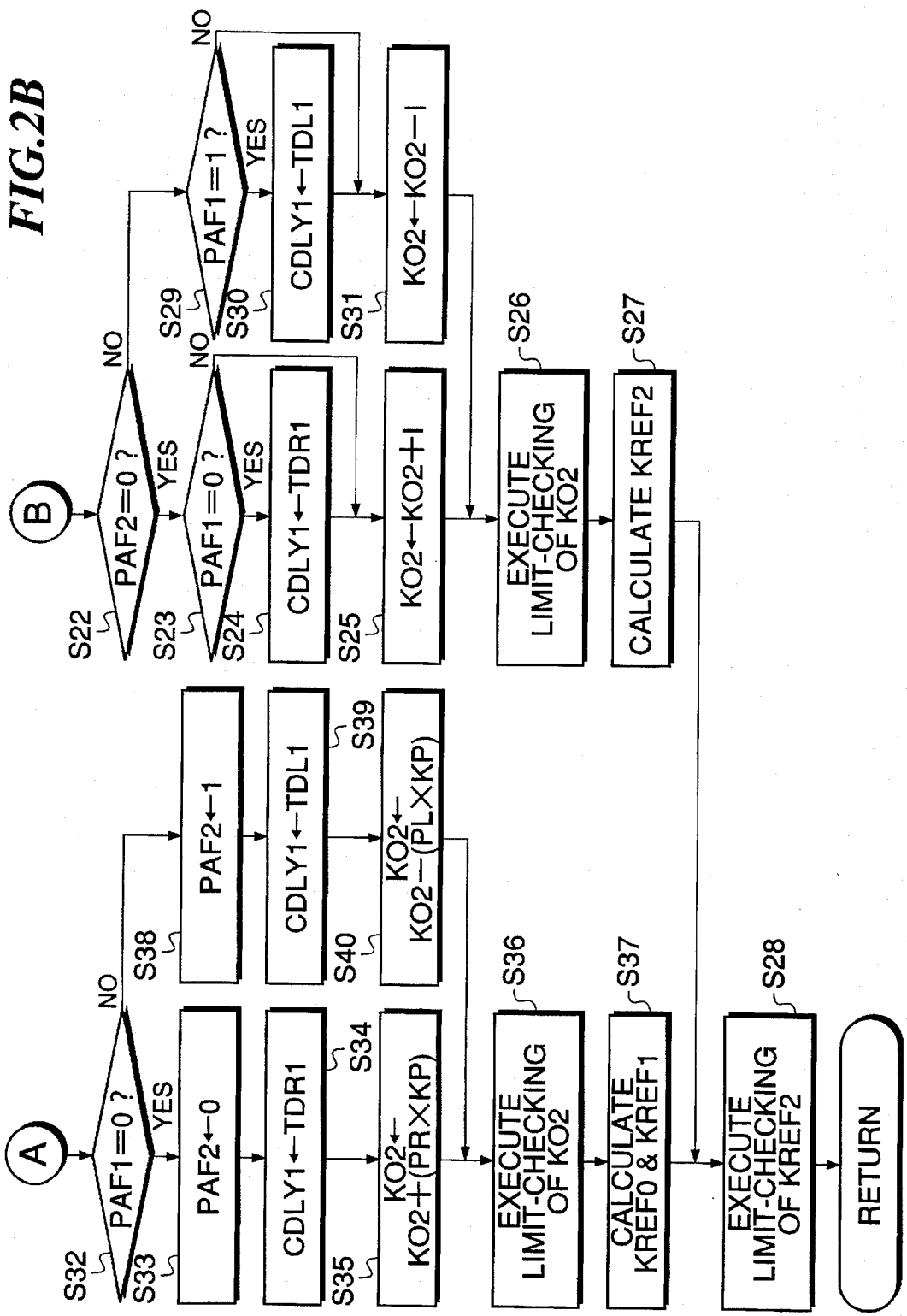
FIG. 2B is a continued part of the FIG. 2A flowchart.

FIGS. 2A and 2B show a program for calculating the air-fuel ratio correction coefficient KO2 applied during O2 sensor output-responsive feedback control. According to this program, the air-fuel ratio correction coefficient KO2 is calculated in response to output voltage PVO2 from the upstream O2 sensor 15 and output voltage SVO2 from the downstream O2 sensor 16 such that the air-fuel ratio of an air-fuel mixture supplied to the engine becomes equal to a stoichiometric value (excess air ratio λ=1).

First, at a step S11, flags PAF1 and PAF2 are initialized. The flag PAF1 indicates lean and rich states of the output voltage PVO2 from the upstream O2 sensor 15, when set to "0" and "1", respectively, and the flag PAF2 indicates lean and rich states of the same after a predetermined delay time has been counted up by a counter CDLY1, referred to hereinafter, when set to "0" and "1", respectively. Then, at a step S12, the air-fuel ratio correction coefficient KO2 is initialized (e.g. set to an average value KREF thereof), followed by the program proceeding to a step S13.

At the step S13, it is determined whether or not the air-fuel ratio correction coefficient KO2 has just been initialized in the present loop. If the answer is negative (NO), the program proceeds to a step S14, wherein it is determined whether or not the upstream O2 sensor output voltage PVO2 is lower than a reference value PVREF (threshold value for determining whether the output voltage PVO2 is rich or lean). If the answer is affirmative (YES), i.e. if PVO2<PVREF holds, it is determined that the output voltage PVO2 from the upstream O2 sensor 15 shows a lean value, and then the flag PAF1 is set to "0" at a step S15, and at the same time the count value CDLY of the counter CDLY1 (set value: CDLY1) for counting a P-term generation delay time TDR1 or TDL1 is decremented by 1. More specifically, if PVO2<PVREF holds, the flag PAF1 is set to "0" and the count value CDLY of the counter CDLY1 is decremented by 1 to thereby obtain the set value CDLY1 whenever the present step is carried out.

Then, at a step S16, it is determined whether or not the set value CDLY1 is smaller than the predetermined delay time TDR1. If the answer is affirmative (YES), i.e. if CDLY1<TDR1 holds, the set value CDLY1 is reset to the delay time TDR1 at a step S17. On the other hand, if the answer to the question of the step S14 is negative (NO), i.e. if PVO2≧PVREF holds, which means that the output voltage PVO2 from the upstream O2 sensor 15 shows a rich value, the flag PAF1 is set to "1", and at the same time the count value CDLY is incremented by 1 at a step S18. More specifically, if PVO2≧PVREF holds, the flag PAF1 is set to "1" and the count value CDLY of the counter CDLY1 is incremented by 1 to thereby obtain the set value CDLY1 whenever the present step is carried out.

Then, at a step S19, it is determined whether or not the set value CDLY1 is smaller than the predetermined delay time TDL1. If the answer is negative (NO), i.e. if CDLY1≧TDL1 holds, the set value CDLY1 is reset to the delay time TDL1 at a step S20. If the answer to the question of the step S16 is negative (NO), i.e. if CDLY1≧TDR1 holds, the program skips over the step S17 to a step S21. Similarly, if the answer to the question of the step S19 is affirmative (YES), i.e. if CDLY1<TDL1 holds, the program skips over the step S20 to the step S21.

At the step S21, it is determined whether or not the sign of the set value CDLY1 of the counter has been inverted. That is, it is determined whether or not the delay time TDR1 or TDL1 has been counted up after the output voltage PVO2 from the upstream O2 sensor 15 crossed the reference value PVREF. If the answer is negative (NO), i.e. if the delay time TDR1 or TDL1 has not elapsed, the program proceeds to a step S22 in FIG. 2B, wherein it is determined whether or not the flag PAF2 has been set to "0". If the answer is affirmative (YES), it is determined at a step S23 whether or not the flag PAF1 has been set to "0". If the answer is affirmative (YES), it is judged that the air-fuel ratio has continuously been lean, so that the program proceeds to a step S24, wherein the set value CDLY1 is reset to the delay time TDR1, followed by the program proceeding to a step S25. On the other hand, if the answer to the question of the step S23 is negative (NO), it is judged that the delay time period has not elapsed yet after the output voltage PVO2 from the upstream O2 sensor 15 was inverted from a rich side to a lean side across the reference value PVREF, so that the program skips over the step S24 to the step S25.

At the step S25, a present value of the air-fuel ratio correction coefficient KO2 is calculated by adding an integral term I to a value of the coefficient KO2 calculated in the immediately preceding loop, by the use of the following equation (2):

$$KO2 = KO2 + I \qquad (2)$$

After execution of the step S25, limit-checking of the resulting value of the correction coefficient KO2 is performed in a known manner at a step S26, and then a value KREF2 (learned value of the correction coefficient KO2 used in starting the vehicle) is calculated at a step S27, followed by executing limit-checking of the resulting value KREF2 at a step S28. Then, the present program is terminated.

On the other hand, if the answer to the question of the step S22 is negative (NO), i.e. if the flag PAF2 is set to "1", it is further determined at a step S29 whether or not the flag PAF1 has been set to "1". If the answer is affirmative (YES), it is judged that the air-fuel ratio has continuously been rich, and then at a step S30, the set value CDLY1 is reset to the delay time TDL1 again, followed by the program proceeding to a step S31. On the other hand, if the answer to the question of the step S29 is negative (NO), it is judged that the delay time has not elapsed yet after the output voltage PVO2 from the upstream O2 sensor 15 was inverted from the lean side to the rich side, so that the program skips over the step S30 to a step S31.

At the step S31, a present value of the correction coefficient KO2 is calculated by subtracting the integral term I from the immediately preceding value of the correction coefficient KO2, by the use of the following equation (3):

$$KO2 = KO2 - I \qquad (3)$$

Then, the above steps S26 to S28 are carried out, followed by terminating the routine.

In this way, when the sign of the set value CDLY1 has not been inverted, the statuses of the flags PAF1 and PAF2 are checked to determine whether or not the output voltage PVO2 from the upstream O2 sensor 15 has been inverted from the lean side to the rich side or vice versa, and the correction coefficient KO2 is calculated based on results of the checking.

On the other hand, if the sign of the set value CDLY1 of the counter has been inverted, i.e. if the answer to the question of the step S21 is affirmative (YES), that is, if the delay time TDR1 or the delay time TDL1 has elapsed after the output voltage PVO2 from the upstream O2 sensor 15 was inverted from the lean side to the rich side or vice versa, the program proceeds to a step S32, wherein it is determined whether or not the flag PAF1 has been set to "0", i.e. whether or not the output voltage PVO2 from the upstream O2 sensor 15 shows a lean value. If the answer is affirmative (YES), i.e. if PAF1=0 holds (the output voltage PVO2 shows a lean value), the program proceeds to a step S33.

At the step S33, the flag PAF2 is set to "0", and then at a step S34, the set value CDLY1 is reset to the delay time TDR1, followed by the program proceeding to a step S35.

At the step S35, a present value of the correction coefficient KO2 is calculated by adding the product of a proportional term PR and a coefficient KP to the immediately preceding value of the correction coefficient KO2 by the use of the following equation (4):

$$KO2 = KO2 + (PR \times KP) \qquad (4)$$

where KO2 on the right side represents the immediately preceding value of the KO2 value, and PR a correction term for stepwise increasing the correction coefficient KO2 to thereby change the air-fuel ratio to the rich side when the delay time TDL1 has elapsed after the output voltage PVO2 from the upstream O2 sensor 15 was inverted from the rich side to the lean side. The proportional term PR is changed in response to the output voltage SVO2 from the downstream O2 sensor 16, and a manner of calculating the same will be described hereinafter. The coefficient KP is set according to operating conditions of the engine 1.

Then, limit-checking of the correction coefficient KO2 calculated as above is carried out at a step S36, and a value KREF0 (average value of the correction coefficient KO2 calculated during idling of the engine) and a value KREF1 (average value of the correction coefficient KO2 calculated when the engine is not idling) are calculated at a step S37. Then, the program proceeds to the step S28, followed by terminating the program.

If the answer to the question of the step S32 is negative (NO), i.e. if the output voltage PVO2 from the upstream O2 sensor 15 shows a rich value (PAF1=1), the program proceeds to a step S38, wherein the flag PAF2 is set to "1", and then at a step S39, the set value CDLY1 is reset to the delay time TDL1, followed by the program proceeding to a step S40.

At the step S40, a present value of the correction coefficient KO2 is calculated by subtracting the product of a proportional term PL and the coefficient KP from the immediately preceding value of the correction coefficient KO2 by the use of the following equation (5):

$$KO2 = KO2 - (PL \times KP) \qquad (5)$$

where KO2 on the right side represents the immediately preceding value of the KO2 value, and PL a correction term for stepwise decreasing the correction coefficient KO2 to thereby change the air-fuel ratio to the lean side when the delay time TDR1 has elapsed after the output voltage PVO2 from the upstream O2 sensor 15 was inverted from the lean side to the rich side. The proportional term PL is changed in response to the output voltage SVO2 from the downstream O2 sensor 16, and a manner of calculating the same will be described hereinafter.

Then, the steps S36, S37 and S28 are sequentially carried out, followed by terminating the program. In this way, the timing of generation of the integral term I and the proportional term PR or PL of the correction coefficient KO2 is calculated based on the output voltage PVO2 from the upstream O2 sensor 15.

Figure 3:
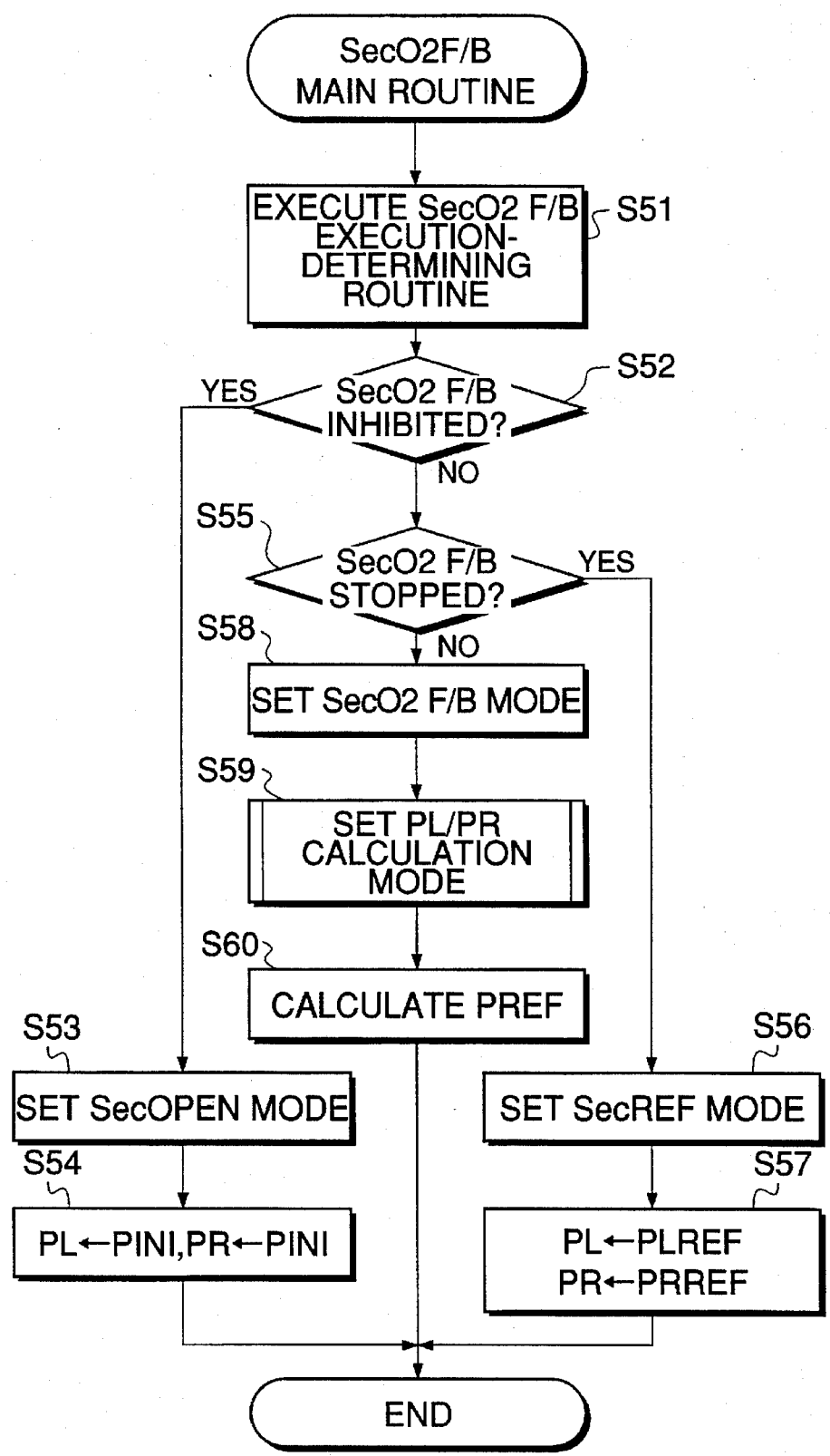
FIG. 3 is a flowchart showing a program for calculating control parameters for use in air-fuel ratio feedback control based on an output from a downstream O2 sensor appearing in FIG. 1.

FIG. 3 shows a main routine for carrying out air-fuel ratio feedback control in response to the output from the downstream O2 sensor 16. This program is for correcting a deviation in the control amount based on the output from the upstream O2 sensor 15 in response to the output SVO2 from the downstream O2 sensor 16.

First, at a step S51, an air-fuel ratio feedback control execution-determining processing is carried out for determining whether the air-fuel ratio feedback control based on the downstream O2 sensor output SVO2 (hereinafter referred to as "the SecO2 F/B") should be inhibited or temporarily stopped. The SecO2 F/B is inhibited when disconnection/short-circuit of the downstream O2 sensor 16 is detected, when the air-fuel ratio feedback control based on the upstream O2 sensor 15 is not being executed, or when the engine is idling, etc. Further, the SecO2 F/B is temporarily stopped when the downstream O2 sensor 16 has not been activated, when the output SVO2 from the downstream O2 sensor 16 is in a transient state, when a predetermined time period has not elapsed after the SecO2 F/B was inhibited, or when a predetermined time period has not elapsed after the SecO2 F/B was temporarily stopped.

Then, at a step S52, it is determined whether or not the SecO2 F/B is being inhibited. If the answer is affirmative (YES), the program proceeds to a step S53, wherein the air-fuel ratio control is set to a downstream O2 sensor-open mode, and then the proportional terms PL and PR are both set to an initial value PINI of the proportional term at a step S54, followed by terminating the program.

If the answer to the question of the step S52 is negative (NO), it is determined at a step S55 whether or not the SecO2 F/B is being temporarily stopped. If the answer is affirmative (YES), the air-fuel ratio control is set to a REF-setting mode at a step S56, and then at a step S57 the proportional terms PL and PR are set to respective learned values PLREF and PRREF calculated by a PREF-calculation processing at a step S60, referred to hereinafter.

If it is determined at the step S55 that the SecO2 F/B is not being temporarily stopped, the air-fuel ratio control is set to a SecO2 F/B mode at a step S58, and at a step S59 the proportional terms PL and PR are calculated based on the output voltage SVO2 from the downstream O2 sensor 16. Further, the PREF-calculation processing is carried out at a step S60 to calculate the learned values PLREF and PRREF of the PL and PR terms, respectively, followed by terminating the program.

Next, an outline of the calculation of the PL and PR term executed at the step S59 will be described.

The PR and PL values are basically calculated based on the output voltage SVO2 from the downstream O2 sensor 16 (during execution of the SecO2 F/B based on the output from the downstream O2 Sensor 16). However, when the SecO2 F/B cannot be executed (e.g. during idling of the engine, when the downstream O2 sensor 16 is not activated, etc.), predetermined values or learned values calculated during the SecO2 F/B are applied as the PR and PL values.

If the output voltage SVO2 from the downstream O2 sensor 16 is lower than a predetermined reference value SVREF (e.g. 0.45 V), i.e. if SVO2<SVREF holds, a correction, term DPL applied when the air-fuel ratio is determined to be lean is added to the PR value and the correction term DPL is subtracted from the PL value. On this occasion, if the PR value after the addition exceeds an upper limit value PRMAX, the PR value is set to the upper limit value PRMAX, while if the PL value after the subtraction becomes lower than a lower limit value PLMIN, the PL value is set to the lower limit value PLMIN.

On the other hand, if SVO2≧SVREF holds, a correction term DPR applied when the air-fuel ratio is determined to be rich is subtracted form the PR value and the correction term DPR is added to the PL value. On this occasion, if the PR value after the subtraction becomes lower than a lower limit value PRMIN, the PR value is set to the lower limit value PRMIN, while if the PL value after the addition exceeds an upper limit value PLMAX, the PL value is set to the upper limit value PLMAX.

By the above processing, during a time period over which SVO2<SVREF holds, the PR value is increased while the PL value is decreased. On the other hand, during a time period over which SVO2≧SVREF holds, the PR value is decreased while the PL value is increased.

Figure 4:
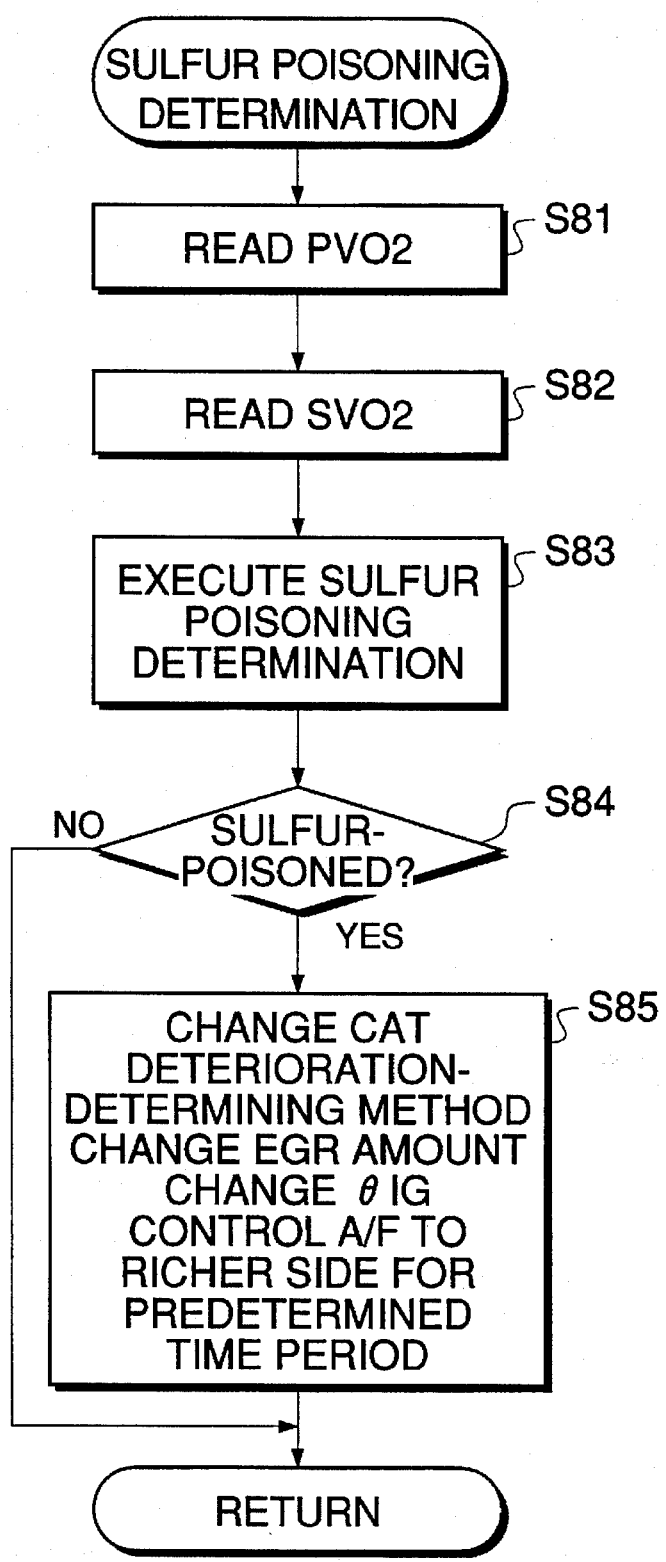
FIG. 4 is a flowchart showing a program for carrying out a determination as to sulfur poisoning of a three-way catalyst appearing in FIG. 1.

FIG. 4 shows a program for carrying out a determination as to sulfur poisoning of the three-way catalyst 14, which is executed during execution of the aforesaid air-fuel ratio feedback control based on the outputs from the upstream and downstream O2 sensors 15 and 16, by the CPU 5b.

First, at a step S81, the output value PVO2 from the upstream O2 sensor 15 is read in, and at a step S82 the output value SVO2 from the downstream O2 sensor 16 is read in. Then, at a step S83, a determination as to sulfur poisoning of the three-way catalyst 14 is carried out based on the downstream O2 sensor output SVO2 , or based on both the upstream O2 sensor output PVO2 and the downstream O2 sensor output SVO2 . Details of manners of the determination will be described hereinafter.

Then, it is determined at a step S84 whether or not the three-way catalyst 14 is sulfur-poisoned, based on the result of the determination processing at the step S83, and if the answer is affirmative (YES), i.e. if the three-way catalyst 14 is sulfur-poisoned, the program proceeds to a step S85, wherein at least one of predetermined countermeasures, referred to hereinafter, is taken, followed by terminating the present routine.

If the answer to the question of the step S84 is negative (NO), i.e. if the three-way catalyst 14 is not sulfur-poisoned, the present routine is immediately terminated.

Next, description will be made of manners of the determination as to sulfur poisoning of the three-way catalyst 14 carried out at the step S83 in FIG. 4.

Figure 5:
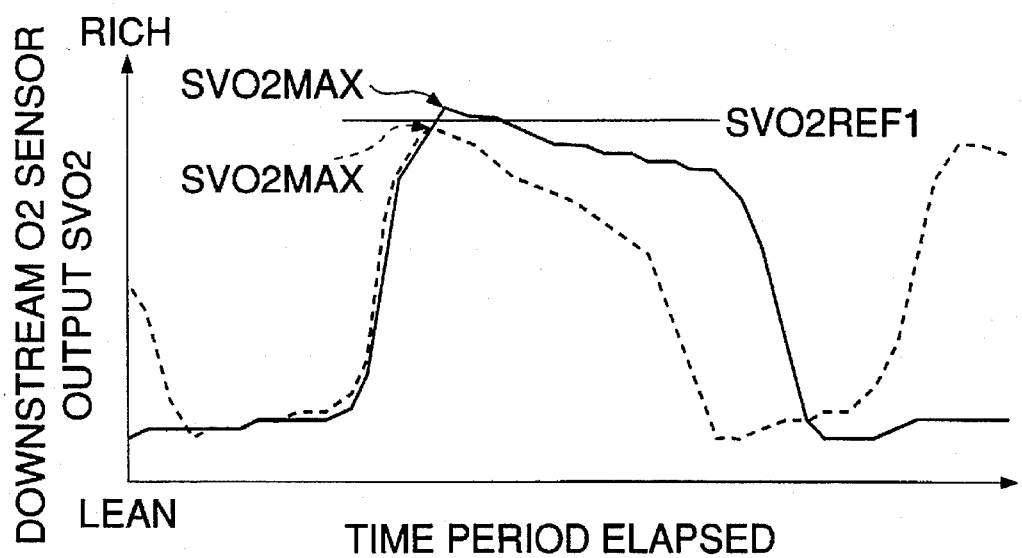
FIG. 5 is a diagram useful in explaining a first manner of determination as to sulfur poisoning of the three-way catalyst.

FIG. 5 is a diagram useful in explaining a first manner of the determination as to sulfur poisoning of the three-way catalyst 14, which shows waveforms of the output SVO2 from the downstream O2 sensor 16, and in which the output SVO2 is plotted on the ordinate and the time period elapsed on the abscissa. In the figure, the solid curve indicates an output waveform obtained when the catalyst 14 is not sulfur-poisoned (when the sulfur content in gasoline is 0 ppm), while the broken curve indicates an output waveform obtained when the catalyst 14 is sulfur-poisoned (when the sulfur content in gasoline is 1000 ppm).

The first manner of the determination is based on an output characteristic of the downstream O2 sensor 16 that the larger the sulfur content in gasoline, the smaller the maximum value of the output SVO2 from the downstream O2 sensor 16. More specifically, it is determined whether or not the maximum value SVO2MAX of the output SVO2 is smaller than a predetermined value SVO2REF1, and if SVO2MAX≦SVO2REF1 holds, it is determined that the three-way catalyst 14 is sulfur-poisoned.

Figure 6:
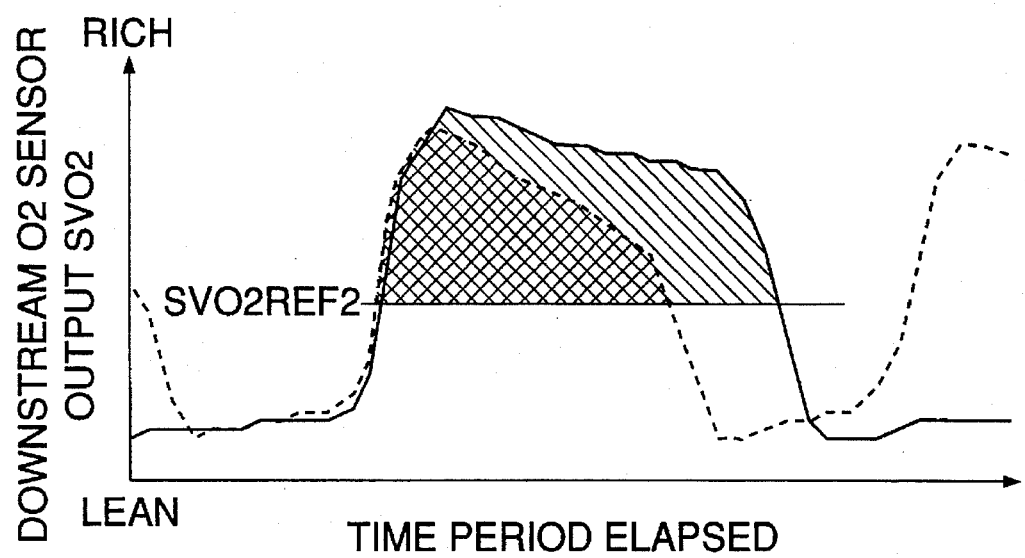
FIG. 6 is a diagram useful in explaining a second manner of determination as to sulfur poisoning of the three-way catalyst.

FIG. 6 is a diagram useful in explaining a second manner of the determination. The second manner is based on an output characteristic of the downstream O2 sensor 16 that the larger the sulfur content in gasoline, the smaller an area obtained by values of the sensor output (the portion hatched by the rightward slanting lines or leftward slanting lines) which exceed a predetermined value SVO2REF2. More specifically, at a time point the output value SVO2 exceeds the predetermined value SVO2REF2, a calculation of an integrated value SD is started by the use of the following equation (6). The calculation is repeatedly executed at predetermined time intervals (time period corresponding to about 1/20 of the repetion period of the output waveform in FIG. 6) until the output SVO2 becomes smaller than the predetermined value SVO2REF2:

$$SD=SD+(SVO2-SVO2REF2) \qquad (6)$$

where SD on the right side represents an immediately preceding value of the integrated value, which is reset to 0 just before the start of the calculation.

The integrated SD value thus obtained is proportional to the area of the hatched portion in the figure. Therefore, it is determined whether or not the integrated value SD is smaller than a predetermined integrated value SDREF, and if SD≦SDREF holds, it is determined that the three-way catalyst 14 undergoes sulfur poisoning.

The waveforms indicated by the solid line and the broken line in FIG. 6 are identical with those in FIG. 5, respectively.

Figure 7:
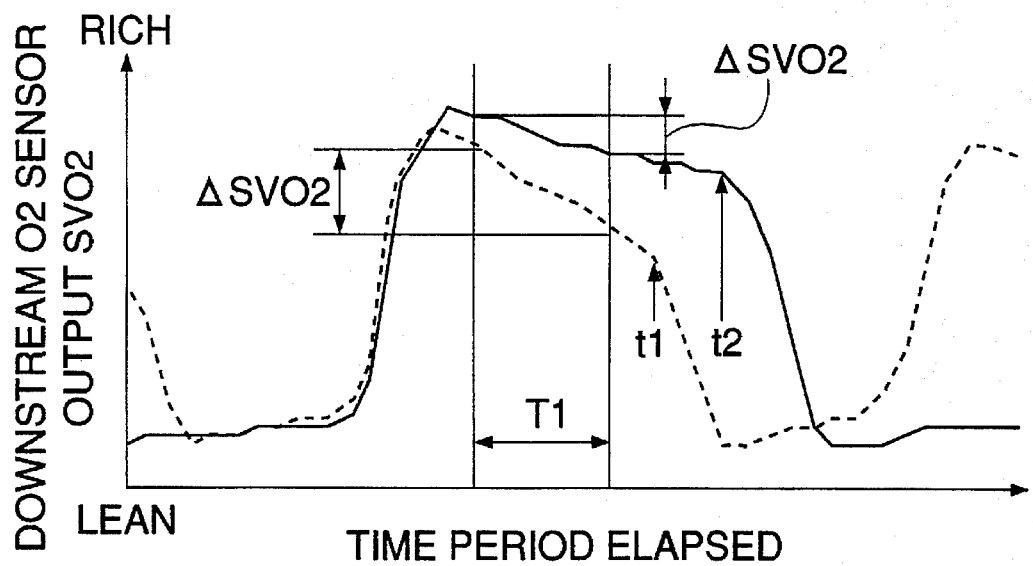
FIG. 7 is a diagram useful in explaining a third manner of determination as to sulfur poisoning of the three-way catalyst.

FIG. 7 is a diagram useful in explaining a third manner of the determination. The waveforms in the figure are identical with those in FIG. 5. The third manner is based on an output characteristic of the downstream O2 sensor 16 that the larger the sulfur content in gasoline, the larger a rate of change in the output SVO2 within a region where the waveform of the downstream O2 sensor output falls rightward, i.e. within a region where the air-fuel ratio of the air-fuel mixture changes in the leaning direction.

More specifically, a predetermined time period T1 is set within a range starting after a time point the sensor output SVO2 becomes the maximum and before a time point the sensor output starts to largely falls (t1 or t2 in the figure), and a rate of change P is calculated based on a variation ΔSVO2 in the sensor output SVO2 over the predetermined time period T1, by the use of the following equation (7):

$$P = |\Delta SVO2/T1| \quad (7)$$

Then, it is determined Whether or not the rate of change P is larger than a predetermined rate of change PREF. If P≧PREF holds, it is determined that the three-way catalyst 14 undergoes sulfur poisoning.

Figure 8:
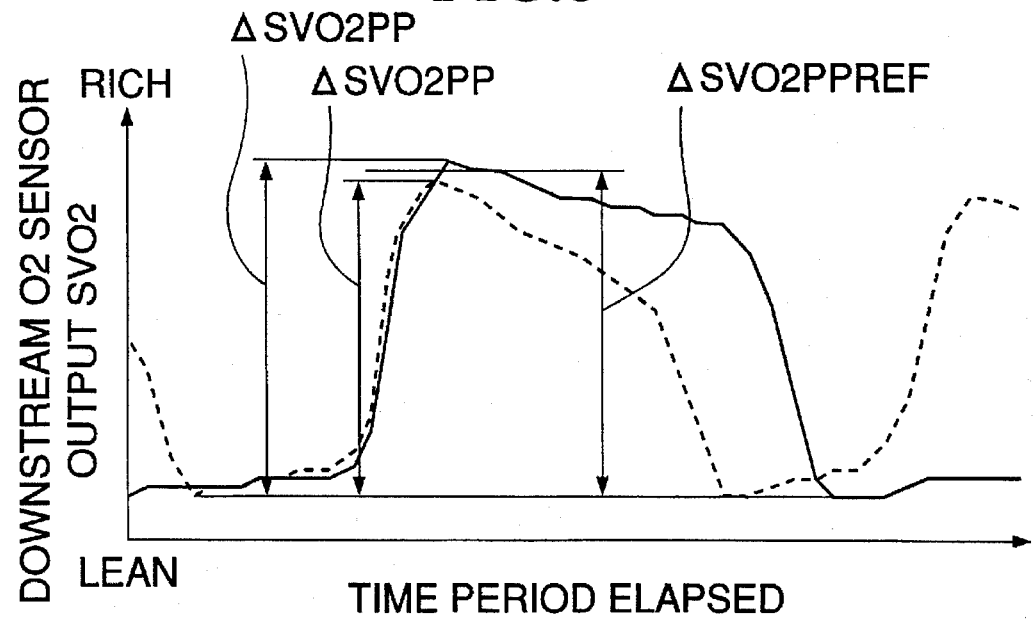
FIG. 8 is a diagram useful in explaining a fourth manner of determination as to sulfur poisoning of the three-way catalyst.

FIG. 8 is a diagram useful in explaining a fourth manner of the determination. The waveforms in the figure are identical with those in FIG. 5. The fourth manner is based on an output characteristic of the downstream O2 sensor 16 that the larger the sulfur content in gasoline, the smaller the amplitude (peak-to-peak value) of the output SVO2 from the downstream O2 sensor 16.

More specifically, it is determined whether or not an amplitude value (difference between the maximum value and the minimum value) ΔSVO2PP of the output SVO2 from the downstream O2 sensor 16 is smaller than a predetermined amplitude value ΔSVO2PPREF, and if Δ SVO2PP≦ΔSVO2 PPREF holds, it is determined that the three-way catalyst 14 undergoes sulfur poisoning.

As described above, according to the first to fourth manners, sulfur poisoning of the three-way catalyst 14 can be easily determined based on the output from the downstream O2 sensor 16. As a result, deterioration of the three-way catalyst 14 caused by sulfur poisoning can be determined while discriminating the same from deterioration due to aging. Thus, an erroneous determination that the three-way catalyst 14 is deteriorated can be prevented.

Figure 9:
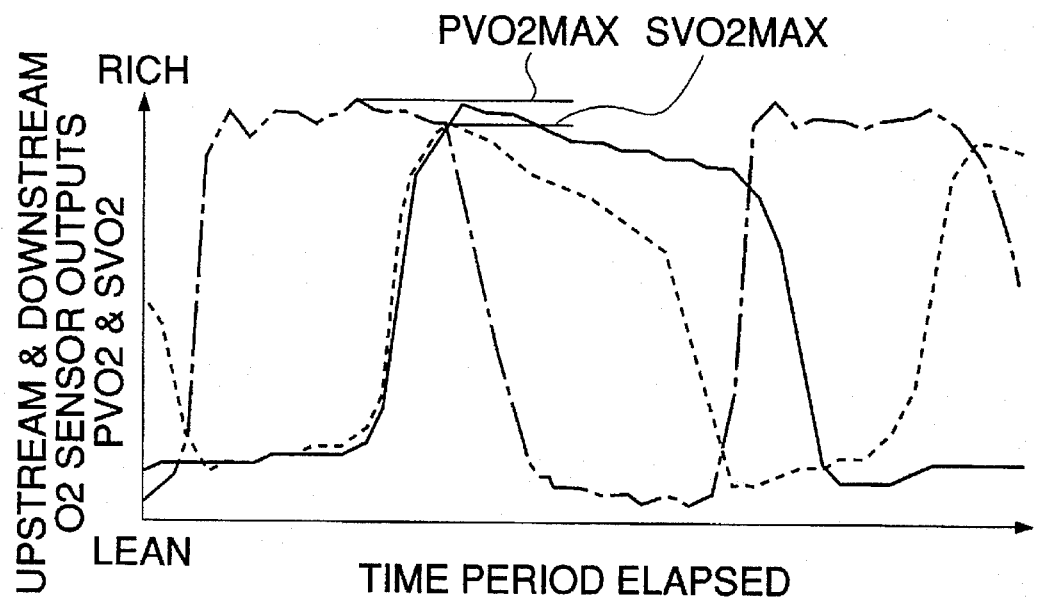
FIG. 9 is a diagram useful in explaining a fifth manner of determination as to sulfur poisoning of the three-way catalyst.

FIG. 9 is a diagram useful in explaining a fifth manner of the determination, which shows waveforms of the outputs from the upstream and downstream O2 sensors 15 and 16, and in which the sensor output SVO2 is plotted on the ordinate and the time period elapsed on the abscissa. In the figure, the dot-dash curve indicates an output waveform of the upstream O2 sensor 15, while the solid curve and the broken curve indicate output waveforms of the downstream O2 sensor 16, which are identical with those in FIG. 5.

The fifth manner of the determination is based on an output characteristic of the downstream O2 sensor 16 that the larger the sulfur content in gasoline, the smaller the rich-side maximum value of the downstream O2 sensor output SVO2 and hence the larger the difference between the rich-side maximun value of the downstream O2 sensor output SVO2 and the rich-side maximum value of the upstream O2 sensor output PVO2.

More specifically, a rich-side maximum output value SVO2MAX from the downstream O2 sensor 16 is subtracted from a rich-side maximum output value PVO2MAX from the upstream O2 sensor 15, to thereby calculate a maximum output difference SUBVO2. Then, it is determined whether or not the maximum output difference SUBVO2 is larger than a predetermined value SUBVO2REF (e.g. 0.15 V), and if SUBVO2≧SUBVO2REF holds, it is determined that the three-way catalyst 14 undergoes sulfur poisoning.

Figure 10:
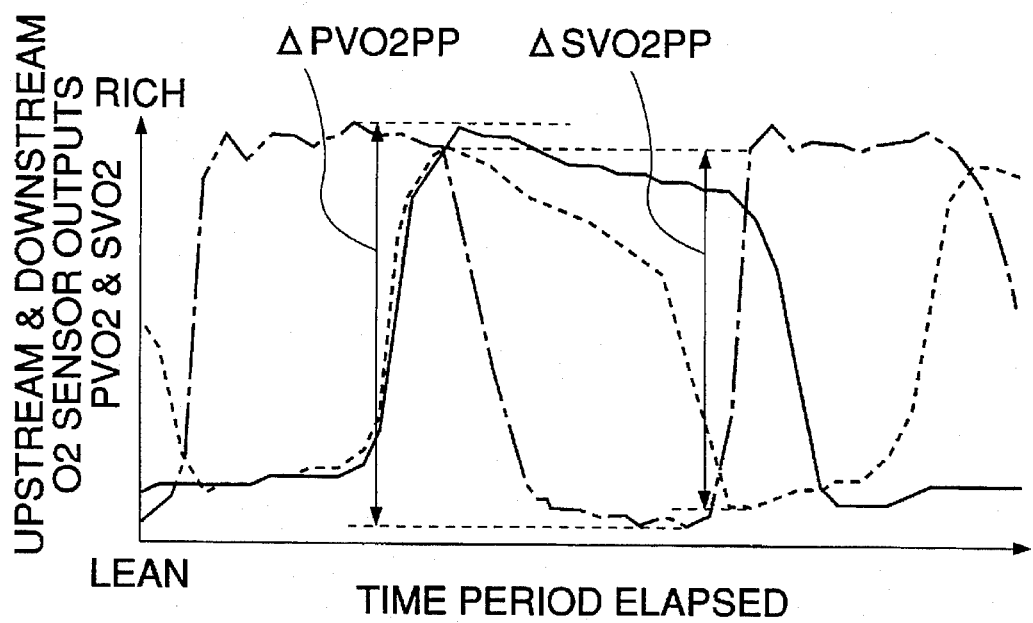
FIG. 10 is a diagram useful in explaining a sixth manner of determination as to sulfur poisoning of the three-way catalyst.

FIG. 10 is a diagram useful in explaining a sixth manner of the determination. The waveforms of the upstream O2 sensor output PVO2 and the downstream O2 sensor outputs SVO2 in the figure are identical to those in FIG. 9, respectively.

The sixth manner is based on the output characteristic of the downstream O2 sensor 16 that the larger the sulfur content in gasoline, the smaller the amplitude of the downstream O2 sensor output SVO2 and hence the larger the difference between the amplitude of the downstream O2 sensor output SVO2 and the amplitude of the upstream O2 sensor output PVO2.

More specifically, an amplitude value (difference between the maximum value and the minimum value) ΔSVO2PP of the output SVO2 from the downstream O2 sensor 16 is subtracted from an amplitude value (difference between the maximum value and the minimum value) ΔPVO2PP of the output PVO2 from the upstream O2 sensor 15, to thereby calculate an amplitude difference ΔSUBVO2. Then, it is determined whether or not the amplitude difference ΔASBVO2 is larger than a predetermined value ΔASBVO2REF. If ΔASBVO2≧Δ SUBVO2 REF holds, it is determined that the three-way catalyst 14 undergoes sulfur poisoning.

As described above, according to the fifth and sixth manners, sulfur poisoning of the three-way catalyst 14 can be easily and more accurately determined based on both the outputs from the upstream and downstream O2 sensors 15 and 16. As a result, deterioration of the three-way catalyst 14 caused by sulfur poisoning can be determined while discriminating the same from deterioration due to aging.

Then, description will be made of countermeasures to be taken when it is determined at the steps S83 and S84 that the three-way catalyst 14 incurs sulfur poisoning, by referring to a step S85 in FIG. 4.

A first countermeasure to be taken is to change the method of detecting deterioration of the three-way catalyst 14. More specifically, a determination reference value for determining deterioration of the catalyst is multiplied by a correction coefficient K, to correct the determination reference value. The correction coefficient K should be set to a value which compensates for the degree of degradation of the oxygen storage capacity of the catalyst due to sulfur poisoning and can eliminate an effect of sulfur poisoning when employed for the determination of the catalyst deterioration. As a result, it can be prevented that the three-way catalyst 14 is erroneously determined to be deteriorated due to aging though it is only sulfur-poisoned.

A second countermeasure to be taken is to change the amount of EGR (amount of exhaust gases to be recirculated). More specifically, the amount of EGR by the exhaust gas recirculation system 25 is increased. As a result, the highest temperature of burned gases is lowered, to thereby restrain an increase in the emission amount of NOx which is caused by degradation of the purifying ability of the catalyst due to sulfur poisoning.

A third countermeasure to be taken is to change the ignition timing θ IG. More specifically, the ignition timing θ IG is retarded. As a result, the highest temperature of burned gases is lowered, to thereby restrain an increase in the exhaust amount of NOx which is caused by degradation of the purifying ability of the catalyst due to sulfur poisoning.

A fourth countermeasure to be taken is to control the air fuel ratio of the air-fuel mixture to the richer side than the stoichiometric air-fuel ratio for a predetermined time period. As a result, desulfurization of the sulfur-poisoned three-way catalyst 14 can be effected, to thereby restore the oxygen storage of the catalyst 14, i.e. the purifying ability of the same.

As described above, when the three-way catalyst 14 is sulfur-poisoned, various countermeasures can be taken. According to the present embodiment, one or all of the above-mentioned first to fourth countermeasures may be taken, or alternatively a plurality of arbitrary countermeasures including the above-mentioned ones may be taken in combination.

Especially, it is preferable to take the following countermeasure: That is, after effecting desulfurization of the three-way catalyst 14 by taking the fourth countermeasure, sulfur poisoning-determination is carried out again. If the three-way catalyst 14 is found to be still sulfur-poisoned even after the desulfurization, one or more of the first to third countermeasures is taken.

Further, determination of deterioration of the three-way catalyst 14 due to aging may be carried out in the following manner, for example: Feedback control of the air-fuel ratio is executed to calculate the air-fuel ratio correction coefficient KO2 based only on the downstream O2 sensor output SVO2, and when an average value of the inversion period of the sensor output SVO2 during the feedback control is lower than a predetermined value, it is determined that the three-way catalyst 14 is deteriorated.

What is claimed is:

1. An air-fuel ratio control system for an internal combustion engine having an exhaust system, and a catalyst arranged in said exhaust system, for purifying exhaust gases emitted from said engine, comprising:

upstream air-fuel ratio-detecting means arranged in said exhaust system at a location upstream of said catalyst, for detecting concentration of a specific component present in said exhaust gases;

downstream air-fuel ratio-detecting means arranged in said exhaust system at a location downstream of said catalyst, for detecting concentration of said specific component present in said exhaust gases;

air-fuel ratio control means for controlling an air-fuel ratio of an air-fuel mixture supplied to said engine, in response to outputs from said upstream and downstream air-fuel ratio-detecting means; and sulfur poisoning-detecting means for detecting deterioration of said catalyst caused by sulfur poisoning, based on at least said output from said downstream air-fuel ratio-detecting means.

2. An air-fuel ratio control system as claimed in claim 1, wherein said sulfur poisoning-detecting means determines that said catalyst is sulfur-poisoned when a rich-side maximum value of said output from said downstream air-fuel ratio-detecting means is below a predetermined value.

3. An air-fuel ratio control system as claimed in claim 1, wherein said sulfur poisoning-detecting means determines that said catalyst is sulfur-poisoned when an area obtained by values of Said output from said downstream air-fuel ratio-detecting means which show richer values of said air-fuel ratio of said air-fuel mixture than a predetermined air-fuel ratio is below a predetermined value.

4. An air-fuel ratio control system as claimed in claim 1, wherein said sulfur poisoning-detecting means determines that said catalyst is sulfur-poisoned when a rate of change in said output from said downstream air-fuel ratio-detecting means from a richer value to a leaner value with respect to a predetermined air-fuel ratio exceeds a predetermined value.

5. An air-fuel ratio control system as claimed in claim 1, wherein said sulfur poisoning-detecting means determines that said catalyst is sulfur-poisoned when amplitude of said output from said downstream air-fuel ratio-detecting means is below a predetermined value.

6. An air-fuel ratio control system as claimed in claim 1, wherein said sulfur poisoning-detecting means determines that said catalyst is sulfur-poisoned when a difference between a rich-side maximum value of said output from said upstream air-fuel ratio-detecting means and a rich-side maximum value of said output from said downstream air-fuel ratio-detecting means exceeds a predetermined value.

7. An air-fuel ratio control system as claimed in claim 1, wherein said sulfur poisoning-detecting means determines that said catalyst is sulfur-poisoned when a difference between amplitude of said output from said upstream air-fuel ratio-detecting means and amplitude of said output from said downstream air-fuel ratio-detecting means exceeds a predetermined value.

* * * * *